United States Patent
Kyllingstad

(10) Patent No.: US 9,163,736 B2
(45) Date of Patent: Oct. 20, 2015

(54) METHOD AND DEVICE FOR PREVENTING A MUD RELIEF VALVE FROM INCORRECT OPENING

(75) Inventor: Age Kyllingstad, Algard (NO)

(73) Assignee: NATIONAL OILWELL VARCO NORWAY AS, Stavanger (NO)

(*) Notice: Subject to any disclaimer, the term of this patent is extended or adjusted under 35 U.S.C. 154(b) by 141 days.

(21) Appl. No.: 14/005,621

(22) PCT Filed: Mar. 27, 2012

(86) PCT No.: PCT/NO2012/050052
§ 371 (c)(1),
(2), (4) Date: Sep. 17, 2013

(87) PCT Pub. No.: WO2012/134302
PCT Pub. Date: Oct. 4, 2012

(65) Prior Publication Data
US 2014/0014191 A1    Jan. 16, 2014

Related U.S. Application Data
(60) Provisional application No. 61/470,313, filed on Mar. 31, 2011.

(51) Int. Cl.
*F16K 17/14* (2006.01)
*F16K 17/40* (2006.01)
*E21B 21/10* (2006.01)

(52) U.S. Cl.
CPC ............... *F16K 13/04* (2013.01); *E21B 21/106* (2013.01); *Y10T 137/0379* (2015.04); *Y10T 137/1692* (2015.04)

(58) Field of Classification Search
CPC ....... F16K 13/04; F16K 17/14; E21B 21/106; E21B 34/063; Y10T 29/49826; Y10T 29/49405; Y10T 29/49815; Y10T 29/49; Y10T 403/56; Y10T 137/1714; Y10T 137/1692; Y10T 137/0379
USPC ..................... 137/68.23, 68.19, 12, 613, 490, 137/565.13–14, 512.1, 513.3–7, 137/599.11–16; 166/373, 363, 364, 367; 175/38, 216–217
See application file for complete search history.

(56) References Cited

U.S. PATENT DOCUMENTS 2,356,410 A  *  8/1944  Krugler ........................ 137/469
2,632,631 A  *  3/1953  Griffin et al. .................... 175/66
(Continued)

FOREIGN PATENT DOCUMENTS

| CN | 201184291 Y | 1/2009 |
| EP | 2378056 A2 | 10/2011 |

(Continued)

OTHER PUBLICATIONS

PCT/NO2012/050052 International Search Report and Written Opinion dated Feb. 15, 2013 (11 p.).

*Primary Examiner* — John K Fristoe, Jr.
*Assistant Examiner* — Minh Le
(74) *Attorney, Agent, or Firm* — Conley Rose, P.C.

(57) ABSTRACT

A device for preventing a primary relief valve in a mud system from opening at a pressure lower than a nominal opening pressure includes a flow restrictor between a mud pump of the mud system and the primary relief valve. In addition, the device includes a cavity between the flow restrictor and the primary relief valve.

17 Claims, 2 Drawing Sheets

(56) References Cited

U.S. PATENT DOCUMENTS

| | | | | |
|---|---|---|---|---|
| 3,338,319 A * | 8/1967 | Griffin, III | | 175/25 |
| 3,902,515 A * | 9/1975 | Douglas et al. | | 137/68.22 |
| 3,964,556 A | 6/1976 | Gearhart et al. | | |
| 4,986,366 A * | 1/1991 | O'Connell | | 169/66 |
| 5,172,956 A * | 12/1992 | Klose et al. | | 303/10 |
| 5,443,146 A * | 8/1995 | Ayyildiz et al. | | 188/374 |
| 5,963,138 A * | 10/1999 | Gruenhagen | | 340/679 |
| 5,975,129 A | 11/1999 | Williams | | |
| 6,027,105 A * | 2/2000 | Dohrmann et al. | | 267/139 |
| 6,216,801 B1 * | 4/2001 | Jonnes | | 175/65 |
| 6,328,055 B1 * | 12/2001 | Burris, II | | 137/68.23 |
| 6,920,085 B2 * | 7/2005 | Finke et al. | | 367/83 |
| 7,051,751 B2 * | 5/2006 | Carroll | | 137/68.23 |
| 7,140,386 B2 * | 11/2006 | Avis et al. | | 137/504 |
| 7,198,102 B2 * | 4/2007 | Virally et al. | | 166/249 |
| 7,472,935 B2 * | 1/2009 | Love | | 293/134 |
| 7,562,723 B2 * | 7/2009 | Reitsma | | 175/72 |
| 7,699,071 B2 * | 4/2010 | Burkhard et al. | | 137/509 |
| 7,708,077 B2 * | 5/2010 | Eriksen et al. | | 166/377 |
| 7,886,847 B2 * | 2/2011 | Eriksen et al. | | 175/57 |
| 8,570,833 B2 * | 10/2013 | Sugiura | | 367/83 |
| 2004/0108138 A1 * | 6/2004 | Cooper et al. | | 175/26 |
| 2005/0092523 A1 * | 5/2005 | McCaskill et al. | | 175/38 |
| 2006/0086538 A1 * | 4/2006 | Van Riet | | 175/66 |
| 2008/0078586 A1 * | 4/2008 | Tettleton et al. | | 175/317 |
| 2010/0170573 A1 * | 7/2010 | Draper et al. | | 137/68.23 |
| 2011/0088797 A1 * | 4/2011 | Nishioka | | 137/565.14 |
| 2012/0000543 A1 * | 1/2012 | Keintzel et al. | | 137/12 |
| 2013/0299240 A1 * | 11/2013 | Leuchtenberg | | 175/48 |

FOREIGN PATENT DOCUMENTS

| | | |
|---|---|---|
| WO | 2008/025936 A1 | 3/2008 |
| WO | 2010/115834 A2 | 10/2010 |

* cited by examiner

METHOD AND DEVICE FOR PREVENTING A MUD RELIEF VALVE FROM INCORRECT OPENING

CROSS-REFERENCE TO RELATED APPLICATIONS

This application is a 35U.S.C. §371 national stage application of PCT/NO2012/050052 filed Mar. 27, 2012, which claims the benefit of U.S. 61/470,313 filed Mar. 31, 2011, both of which are hereby incorporated herein by reference in their entirety for all purposes.

STATEMENT REGARDING FEDERALLY SPONSORED RESEARCH OR DEVELOPMENT

Not applicable.

BACKGROUND

The disclosure relates generally to devices and methods for preventing a primary mud relief valve from incorrect opening. More particularly, the disclosure relates to devices and methods for preventing a primary relief valve in a mud system from incorrect opening.

Mud systems, as known from drilling rigs, normally include a mud pump, a pulsation dampener and a relief valve, the latter herein termed "primary relief valve". The main pump is typically a triplex pump. This kind of pump delivers a flow rate which is far from constant and fluctuates much because of i) variable piston speed—the pump is crank shaft driven, ii) mud compressibility and iii) valve and fluid inertia. The pulsation dampener is therefore included to smoothen the flow rate and mitigate the resulting pressure fluctuations. The primary relief valve may be of a design known as a "pop-off valve" in the industry, or a rupture disk. Other types of relief valves are also known.

The primary relief valve is a safety valve that is designed to prevent excessive pressure and possible hazards in the case the pump pressure exceeds the certified pressure limit for the system. Normally the so-called trip pressure, at which the primary relief valve shall switch from a closed to an open state, is set slightly higher that the system pressure of typically 5000 psi (345 bar).

It is a well-known problem in the industry that the primary relief valve sometimes trips frequently even though the recorded pressure levels never reached the nominal trip pressure level.

Tripping of a primary relief valve represents a costly and highly undesired disruption of the drilling process, both because of the time it takes to refit a new rupture disk or to reset a resettable primary relief valve and because the well can be damaged during long periods of no circulation. To lower the risk for primary relief valve tripping one can therefore reduce maximum working pressure to say 80 per cent of the system pressure limit. This is also a costly solution because flow rate and pressure is often a limiting factor that can lead to slower drilling and even cause well stability problems. The opposite solution of increasing the nominal trip pressure to compensate for the dynamic effect is also a highly undesirable solution that may lead to damage in other parts of the mud system. It may even be illegal to raise the nominal relief valve pressure to more than a few per cent over the certified system pressure.

BRIEF SUMMARY OF THE DISCLOSURE

The purpose of the embodiments described herein is to overcome or reduce at least one of the disadvantages of the prior art.

The purpose is achieved according to the embodiments described herein by the features as disclosed in the description below and in the following patent claims.

According to a first aspect of the invention there is provided a method for preventing a primary relief valve in a mud system from opening at a pressure lower than a nominal opening pressure, and where the mud system includes a mud pump, wherein the method includes:
 installing a flow restrictor between the mud pump and the primary relief valve; and
 providing a cavity between the flow restrictor and the primary relief valve.

A field study of above stated problem has revealed that the reason for the tripping of the primary relief valve at a pressure lower than the nominal opening pressure, most likely is relatively large pressure fluctuations in a pop-off line. Despite of the damping action of a pulsation dampener, there are substantial residual pressure fluctuation present in a discharge pipe between the pump and the dampener. The pop-off line itself represents a hydraulic resonator that can significantly amplify these residual fluctuations at frequencies close to resonance frequencies. This explanation is supported by special pressure measurements just below the primary relief valve showing that the peak dynamic pressure can sometimes exceed 115 per cent of the mean pressure.

These pressure fluctuations can lead to undesired primary relief valve trips, both because the peak pressure are really higher than seen on the standard pressure sensors, and because they can lead to fatigue and lowering of the real trip pressure. This fatigue effect is especially relevant if the primary relief valve is a rupture disk.

It has thus been found that the opening of the primary relief valve is related to pressure variation at higher frequencies, typically in the region of 40 Hz. Pressure fluctuations at this frequency has been measured to be up to 40 bars. Such fluctuations are superimposed on the mean pressure and are believed to cause the tripping of the primary relief valve at a pressure lower than the nominal opening pressure.

The high frequency pressure fluctuation components appear to be generated by the mud pumps and are related to the pump valve action. Both mud compressibility and pump valve inertia tend to cause sudden changes in the pump flow rate when the pump discharge valves open and closes. The changes give rise to a pressure pulse that is enhanced at frequencies close to the resonance frequencies of the closed primary relief valve line.

By installing a flow restriction between the mud pump and the primary relief valve in combination with a cavity positioned between the flow restriction and the primary relief valve, these higher frequency pressure fluctuations are dampened. The pressure acting on the primary relief valve is then the mean operating pressure of the mud system. The relation between the size of the flow restrictor and the cavity volume should be calculated according to known principles, or it should be found experimentally by testing different size/volume ratios.

The flow restrictor may be in the form of a tubing having a diameter much smaller than the so called characteristic dimension of the cavity, say smaller than the cubic root of said cavity, and a length much longer than the diameter of the flow restriction.

Said flow restrictor may be in the form of an opening in a plate where the opening has a diameter much smaller than the characteristic dimension of the cavity.

The method may include placing a second relief valve in parallel with the flow restrictor, preferably with a lower nominal trip pressure than the primary relief valve. This second relief valve will normally only experience the dynamic pressure difference as it receives the mud pump pressure on one side and the smoothed pressure at the cavity on the other side.

If the primary relief valve trips, the second relief valve will experience full pressure difference and also trip if the pressure still is too high.

According to a second aspect of the invention there is provided device for preventing a primary relief valve in a mud system from opening at a pressure lower than a nominal opening pressure and where the mud system includes a mud pump, wherein a flow restrictor is positioned between the mud pump and the primary relief valve, and where a cavity is provided between the flow restrictor and the primary relief valve.

A second relief valve may be placed in parallel with the flow restriction.

The flow restriction may be provided in the second relief valve. The flow restriction and the second relief valve may thus constitute a single unit.

A rupture disk may constitute the second relief valve. The rupture disk may be equipped with one or more flow restrictions.

In a practical embodiment of the invention, the primary relief valve, the flow restriction, the second relief valve and the cavity may be produced as one unit that is fairly compact and suitable for installation in a mud system.

The method and device according to the invention render it possible to overcome the long felt problem of incorrect opening of the primary relief valve of a mud system.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
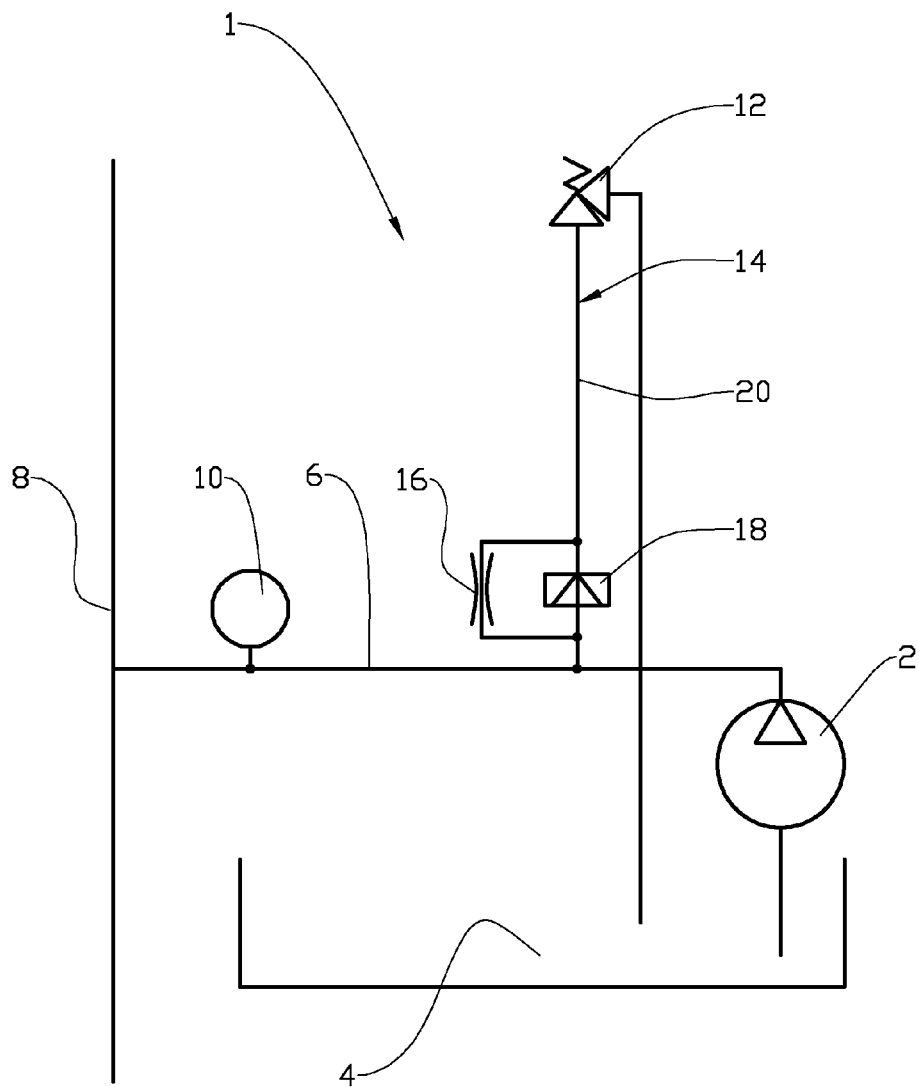
FIG. 1 is a schematic partial view of an embodiment of a mud system including a flow restriction in accordance with the principles described herein.

On the drawings the reference number 1 denotes a part of a mud system that includes a mud pump 2 that draws mud from a mud reservoir 4 and discharge the mud via a discharge pipe 6 into a so-called stand pipe 8. A pulsation dampener 10 is connected to the discharge pipe 6. A primary relief valve 12 is connected to the discharge pipe 6 via a so-called pop-off line 14. In this exemplary embodiment, the primary relief valve 12 is a pop-off valve. However, in other embodiments, the primary relief valve 12 may be a rupture disk or another suitable valve.

In this embodiment, a flow restriction 16 is provided between the mud pump 2 and the primary relief valve 12, or more precisely between the discharge pipe 6 and the primary relief valve 12.

A second relief valve 18, which may be of a type similar to the primary relief valve 12, is positioned in parallel with the flow restriction 16. A cavity 20 is closed off in the pop-off line 14 between the primary relief valve 12 and the second relief valve 18. The cavity 20 communicates with the discharge pipe 6 through the flow restriction 16.

The second relief valve 18 is preferably set to open at approximately the same or a slightly lower pressure than that of the primary relief valve 12.

As stated in the general part of the description, the cavity 20 in relation to the size of the flow restriction 16 should be determined according to well known principles in order to dampen the dynamic frequency pressure at the actual frequencies.

This done, as the mud pump 2 operates, the high frequency pressure fluctuation components are dampened in the flow restriction 16/cavity 20 dampener system. Thus, the primary relief valve 12 only experiences the average pressure present in the cavity 20.

The second relief valve 18 has the pressure from the mud pump 2 acting on the side facing the discharge pipe 6, while the average pressure is acting on the side of the second relief valve 18 facing the cavity 20. The resultant pressure across the second relief valve 18 equals the dynamic pressure fluctuations in the discharge line 6, normally with zero mean.

If the average pressure exceeds the trip pressure of the primary relief valve 12, the primary relief valve 12 opens. Then, as the flow through the flow restriction 16 is minute compared to that of the primary relief valve 12, the pressure over the second relief valve 18 will equal the full pressure from the mud pump 2. The second relief valve 18 will then also open if the high average pressure is still present. To ensure tripping of the second relief valve 18, its trip pressure may preferably be slightly lower than the trip pressure of the primary relief valve 12.

Figure 2:
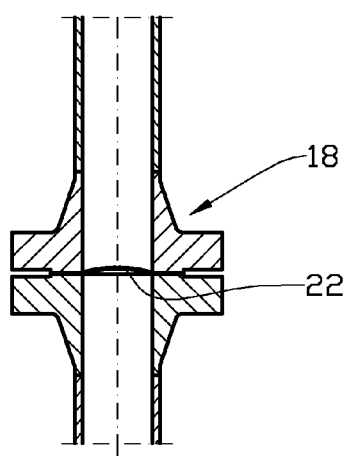
FIG. 2 is a cross-sectional view of an embodiment in accordance with the principles described herein where the flow restriction is placed in the second relief valve.
Figure 3:
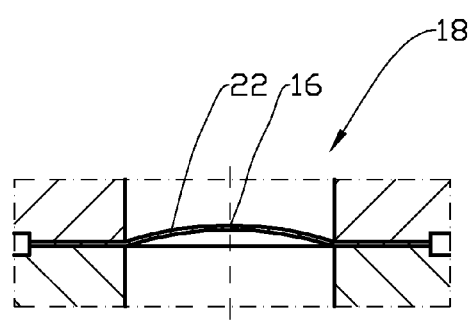
FIG. 3 is an enlarged partial view of the flow restriction of FIG. 2.

In an alternative embodiment shown in FIG. 2, the pressure sensing component of the second relief valve 18 is a rupture disk 22. A flow restriction 16 is incorporated in the rupture disk 22, see FIG. 3. Aside from the second relief valve 18 being a rupture disk in this embodiment, rather than a pop-off valve, mud system 1 and its functioning are as previously described.

The invention claimed is:

1. A method for preventing a primary relief valve in a mud m from opening at a pressure substantially lower than a nominal opening pressure, wherein the mud system includes a mud pump, the method comprising:
   installing a flow restrictor between the mud pump and the primary relief valve;
   providing a cavity between the flow restrictor and the primary relief valve; and
   placing a second relief valve in parallel with the flow restrictor.

2. The method of claim 1, wherein the flow restrictor comprises a tubular having a diameter smaller than a characteristic dimension of the cavity and a length greater than the diameter.

3. The method of claim 2, further comprising:
   selecting the characteristic dimension of the cavity to equal the cubic root of the cavity.

4. The method of claim 1, wherein the flow restrictor comprises an opening in a plate, wherein the opening has a diameter smaller than a characteristic dimension of the cavity.

5. The method of claim 1, wherein the second relief valve has a nominal opening pressure that is less than or equal to the nominal opening pressure of the primary relief valve.

6. A device for preventing a primary relief valve in a mud system from opening at a pressure lower than a nominal opening pressure, wherein the mud system includes a mud pump, the device comprising:
   a flow restrictor positioned between the mud pump and the primary relief valve;

a cavity provided between the flow restrictor and the primary relief valve; and a second relief valve positioned in parallel with the flow restrictor.

7. The device of claim 6, wherein the flow restrictor is provided in the second relief valve.

8. The device of claim 7, wherein the second relief valve is a rupture disk.

9. The device of claim 8, wherein the flow restrictor is provided in the rupture disk.

10. The device of claim 6, wherein the flow restrictor comprises a tubular having a diameter smaller than a characteristic dimension of the cavity and a length greater than the diameter of the tubular.

11. The device of claim 6, wherein the flow restrictor comprises an opening in a plate, wherein the opening has a diameter smaller than a characteristic dimension of the cavity.

12. The device of claim 11, wherein characteristic dimension of the cavity equals the cubic root of the cavity.

13. The device of claim 6, wherein the second relief valve is in series with the cavity.

14. The device of claim 6, wherein second relief valve has a nominal opening pressure that is less than or equal to the nominal opening pressure of the primary relief valve.

15. A mud system, comprising:
a mud pump;
a primary relief valve configured to prevent excessive pressurization of the mud system;
a dampener system positioned between the mud pump and the primary relief valve, wherein the dampener system comprises:
a flow restrictor; and
a cavity positioned between the flow restrictor and the primary relief valve;
wherein the dampener system further comprises a second relief valve arranged in parallel with the flow restrictor.

16. The mud system of claim 15, wherein flow restrictor includes an opening having a diameter smaller than a characteristic dimension of the cavity.

17. The mud system of claim 16, wherein the second relief valve is arranged in series with the cavity.

* * * * *